United States Patent
Poole et al.

(10) Patent No.: US 11,150,038 B1
(45) Date of Patent: *Oct. 19, 2021

(54) ELECTROMAGNETIC WAVEGUIDE BASED THERMAL ENERGY EXTRACTION WITH EMISSIVE MATERIALS AND MODIFICATIONS

(71) Applicant: Energy, United States Department of, Washington, DC (US)

(72) Inventors: Zsolt Poole, Pittsburgh, PA (US); Paul R. Ohodnicki, Jr., Allison Park, PA (US)

(73) Assignee: U.S. Department of Energy, Washington, DC (US)

( * ) Notice: Subject to any disclaimer, the term of this patent is extended or adjusted under 35 U.S.C. 154(b) by 438 days.

This patent is subject to a terminal disclaimer.

(21) Appl. No.: 15/276,514

(22) Filed: Sep. 26, 2016

Related U.S. Application Data

(60) Provisional application No. 62/233,484, filed on Sep. 28, 2015.

(51) Int. Cl.
*F28F 13/00* (2006.01)
*F28F 13/18* (2006.01)
(Continued)

(52) U.S. Cl.
CPC .............. *F28F 13/00* (2013.01); *F28F 13/18* (2013.01); *F28F 21/081* (2013.01);
(Continued)

(58) Field of Classification Search
CPC .... G02B 6/04; G02B 6/10; F28F 13/00; F28F 13/18; F28F 21/081; F28F 21/086; F28F 21/089

See application file for complete search history.

(56) References Cited

U.S. PATENT DOCUMENTS

| 4,576,486 | A | * | 3/1986 | Dils | .......................... | G01J 5/08 |
| | | | | | | 250/339.04 |
| 4,794,619 | A | * | 12/1988 | Tregay | ...................... | G01J 5/08 |
| | | | | | | 374/126 |

(Continued)

*Primary Examiner* — Natalie Huls
(74) *Attorney, Agent, or Firm* — Timothy L. Harney; Daniel D. Park; Brian J. Lally

(57) ABSTRACT

The method presented uses thermally emissive materials for the extraction of heat through the use of electromagnetic waveguides, wherein the emissive material comprises materials which emit electromagnetic radiation due to thermal excitation, wherein the electromagnetic radiation is coupled to electromagnetic waveguides; a receiver adapted to receive the electromagnetic radiation for utilization, wherein the extracted electromagnetic radiation may propagate arbitrary distances inside the waveguides before the need for processing, for example, to maximize the temperature differential between the emissive material and that of the receiver; and the exchange of the chemical composition of some portion of the environment the apparatus is housed in. The thermal energy extraction apparatus described herein has the purpose of removing heat from a source for conversion to other forms of energy such as electricity and for thermal management applications. Wherein for heat management, the benefit of waveguides would constitute reduced interference with electronics through electromagnetic coupling.

9 Claims, 8 Drawing Sheets

(51) Int. Cl.
*G02B 6/10* (2006.01)
*F28F 21/08* (2006.01)
*G02B 6/04* (2006.01)

(52) U.S. Cl.
CPC .......... *F28F 21/086* (2013.01); *F28F 21/089* (2013.01); *G02B 6/04* (2013.01); *G02B 6/10* (2013.01)

(56) References Cited

U.S. PATENT DOCUMENTS

| | | | | |
|---|---|---|---|---|
| 5,164,999 | A * | 11/1992 | Shifflett | G01J 5/00 250/227.14 |
| 5,355,423 | A * | 10/1994 | Phillips | G01K 11/20 374/131 |
| 8,411,275 | B1 * | 4/2013 | Ohodnicki, Jr. | G01N 21/554 356/437 |
| 8,638,440 | B1 * | 1/2014 | Ohodnicki, Jr. | G01N 21/783 356/437 |
| 8,741,657 | B1 * | 6/2014 | Ohodnicki | G01N 21/554 436/100 |
| 8,836,945 | B1 * | 9/2014 | Ohodnicki, Jr. | G01N 21/783 356/437 |
| 9,019,502 | B1 * | 4/2015 | Ohodnicki, Jr. | G01N 21/783 356/437 |
| 9,964,494 | B1 * | 5/2018 | Poole | G01N 21/554 |
| 10,173,792 | B1 * | 1/2019 | Burckel | B64G 1/58 |
| 2003/0236642 | A1 * | 12/2003 | Timans | G01J 5/0003 702/99 |
| 2014/0321798 | A1 * | 10/2014 | Chen | G01N 21/05 385/12 |
| 2017/0176118 | A1 * | 6/2017 | Patterson | F28F 27/00 |

* cited by examiner

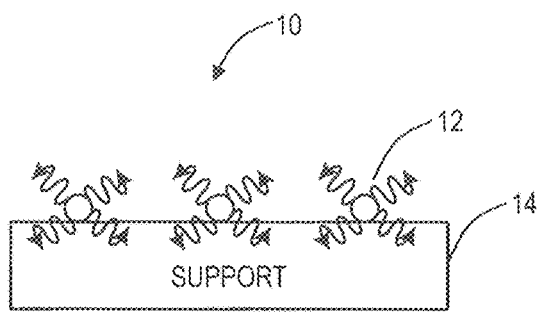
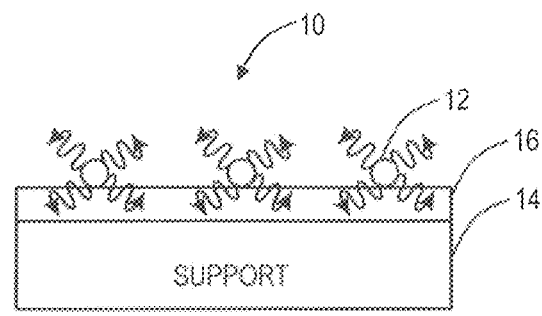
FIG. 1A
FIG. 1B
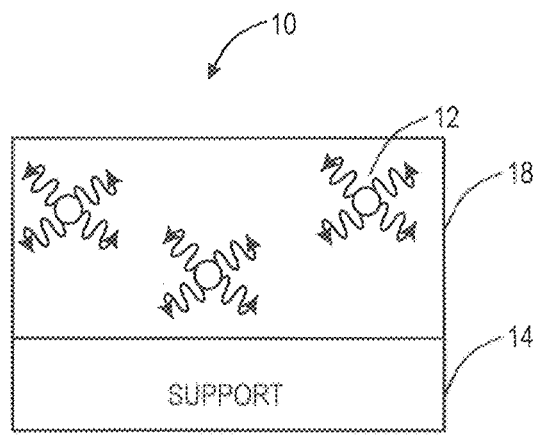
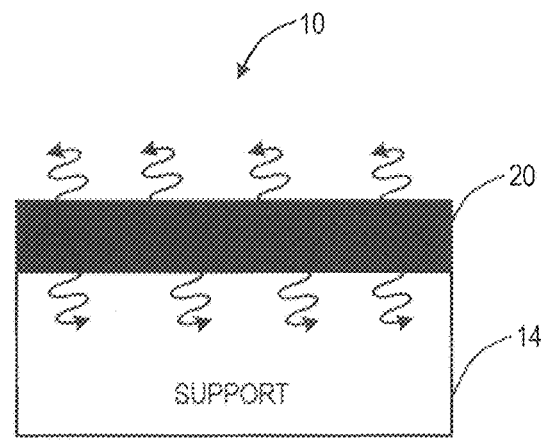
FIG. 1C
FIG. 1D
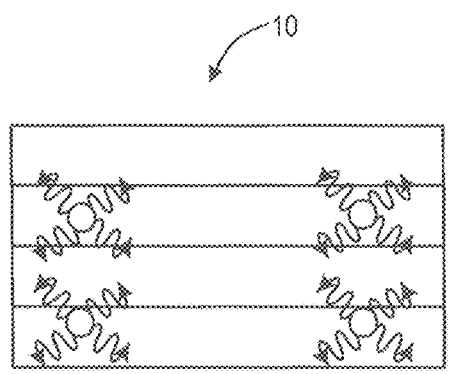
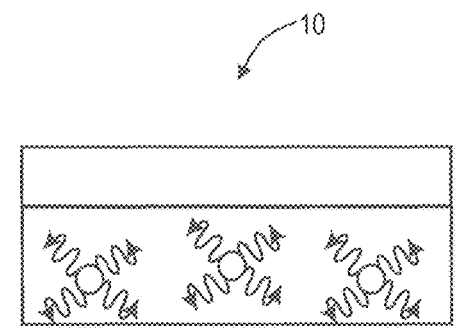
FIG. 1E
FIG. 1F

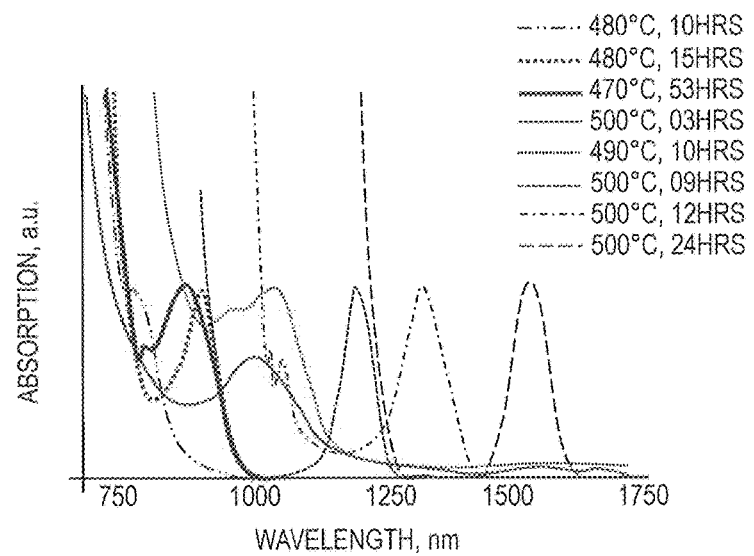
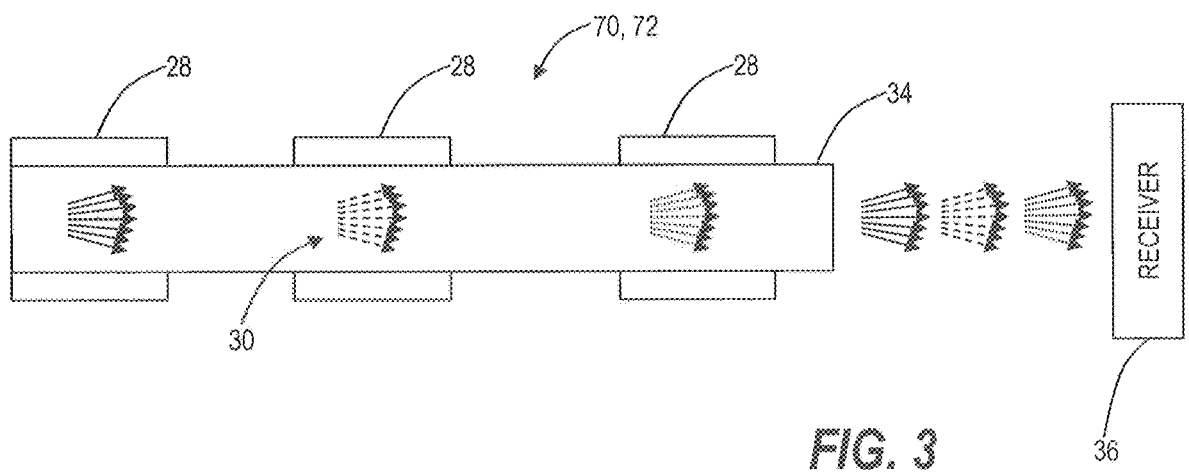
FIG. 3

|  | 800C (2%O2) | 800C(5%H2) | 1100C(5%H2) |
|---|---|---|---|
| Nb-TiO2 | 4.25μW | 5.15μW | 24.15μW |
| TiO2 | 3μW | 4.3μW | 22.6μW |
| Mesoporous TiO2 | 2μW | 3μW | 21.75μW |
| Bare-Fiber-End | 1.6μW | 2.25μW | 11.3μW |
| Bare-Fiber-Through | 0.11μW | 0.3μW | 1.37μW |
|  |  |  |  |
|  |  |  | 1100C(air) |
| CaMnNbO3 |  |  | 20μW |

*FIG. 6A*

| Mesoporous TiO2 | | |
|---|---|---|
| Temperature | Power | Power Density |
| 800C (2%O2 in N2) | 2μW | 4.1mW/cm2 |
| 800C(H2) | 3μW | 6.1mW/cm2 |
| 900C(N2) | 5.5μW | 11.2mW/cm2 |
| 1000C(N2) | 10μW | 20.4mW/cm2 |
| 1100C(N2) | 17.5μW | 35.7mW/cm2 |
| 1100C(4%H2 in N2) | 21.75μW | 44.3mW/cm2 |
|  |  |  |
| 1200C(4%H2 in N2) | 39μW | 79mW/cm2 |
| 1300C(4%H2 in N2) | 70μW | 142mW/cm2 |
| 1400C(4%H2 in N2) | 126μW | 256mW/cm2 |
| 1500C(4%H2 in N2) | 227μW | 462mW/cm2 |
| 1700C(4%H2 in N2) | 409μW | 833mW/cm2 |
| 1800C(4%H2 in N2) | 735μW | 1497mW/cm2 |
| 1900C(4%H2 in N2) | 1323μW | 2695mW/cm2 |
| 2000C(4%H2 in N2) | 2381μW | 4850mW/cm2 |

Measured: 800C (2%O2 in N2) through 1100C(4%H2 in N2)
Projected: 1200C(4%H2 in N2) through 2000C(4%H2 in N2)

*FIG. 6B*

| | Power Density (1100C) |
|---|---|
| Nb-TiO2 | 50mW/cm2 |
| TiO2 | 46mW/cm2 |
| Mesoporous TiO2 | 44mW/cm2 |
| CaMnNbO3 | 41mW/cm2 |
| Bare-Fiber-End | 23mW/cm2 |
| Bare-Fiber-Through | 2.8mW/cm2 |

ELECTROMAGNETIC WAVEGUIDE BASED THERMAL ENERGY EXTRACTION WITH EMISSIVE MATERIALS AND MODIFICATIONS

RELATED APPLICATION(S)

The present patent/application claims priority to U.S. Provisional Pat. No. 62/233,484 filed Sep. 28, 2015, and entitled "A METHOD FOR PERFORMING BLACKBODY THERMAL EMISSION BASED CHEMICAL SPECTROSCOPY ANALYSIS AND OPTICAL FIBER BASED SENSORS FOR CARRYING OUT THE SAME."

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE DISCLOSURE

The present disclosure generally relates to optical waveguide based thermal energy extraction systems and methods. Particularly, an electromagnetic waveguide system with material constituents that improve upon the extraction of thermal energy in the form of electromagnetic radiation to a location removed from a source generating the thermal energy. More particularly, the present disclosure relates to thermally emissive materials integrated with an optical waveguide for thermal energy extraction in the form of electromagnetic radiation. The thermally emissive materials emit electromagnetic radiation collected by the waveguide to create a flow of energy from the thermal energy (heat) source out through the waveguide to a location removed from the heat source. The thermally emissive materials facilitate the collection of electromagnetic energy by the waveguide, by tunneling electromagnetic radiation into the waveguide, by scattering electromagnetic radiation into the waveguide, and/or by directly emitting electromagnetic radiation into the waveguide. Furthermore, some portion of the environment composition of the thermal energy extraction apparatus may be exchanged with a different composition, such as one containing hydrogen fore example which, in some cases, can provide a benefit in a desired parameter of the energy extraction apparatus, such as the extracted energy density.

In exemplary embodiments, the thermally emissive materials are integrated with an optical fiber platform in an evanescent configuration or in the end coating configuration, or both. It is contemplated herein that there are numerous methods of implementation by which thermal energy of an environment could be extracted with waveguides to locations removed from the heat source. The thermal energy extracted in this manner can be used for: the generation of useful electrical energy through a receiving apparatus such as a photovoltaic cell; the removal of heat from a source to a location removed from the heat source for the purpose of cooling without having compositional constituents which could electromagnetically interfere with the operations of electronics such as converters, transformers, and etc.; and the conversion of energy into other forms for utilization.

It is also contemplated that the thermally emissive material can be in other material phases, other than a solid, such as, without limitation, liquid, gas, plasma, etc. Therefore, the waveguide based apparatus described herein could extract said electromagnetic radiation when the waveguide is brought into communication range of the exemplary emissive materials, existing in various material phases, though directly coupling into the waveguide, and though assisted coupling by the use of emissive materials integrated with the waveguide. Herein, assisted coupling is accomplished by tunneling, scattering, and directly emitting electromagnetic radiation into the waveguide. The collected electromagnetic radiation by the waveguide is then extracted to a location removed from the energy source, an arbitrary distance that is beneficial and received by a receiver adapted to the electromagnetic radiation.

BACKGROUND OF THE DISCLOSURE

Energy in a useful form is a vital resource and hence there is a continuous strive to improve existing technologies and to find new ones that address that basic need. The conversion of thermal energy is the primary source of generating electrical energy from a broad range of sources such as, for example coal, oil, natural gas, solar, geothermal, and nuclear energy. A common need in all cases is the ability to efficiently extract the generated electromagnetic and thermal energy and to convert it to electricity. It is foreseen that the proposed method and apparatus of optical waveguide based thermal energy extraction can be implemented with all the methods that convert other forms of energy into heat, which is then used to generate electricity or other useful forms of energy.

Materials having the property of emitting electromagnetic radiation when placed in thermal core communication with heat sources can he incorporated with waveguides through a variety of methods such as by the addition of ever-layer using standard thin film processing techniques, nanofabrication, sputtering, chemical vapor deposition, etc. A planar waveguide structure could be surrounded by emissive materials which convert thermal energy into electromagnetic energy where the waveguide provides electromagnetic channels through which thermal radiation can be extracted. The waveguide itself can be modified by a variety of methods to all or part of its constituents to modify the optical absorptivity and/or the real part of the refractive index as needed, such as by ion implantation, doping, etching, thin-film deposition, alterations in the constituents to one having a beneficial property during manufacturing, etc. As one example, gradients could be engineered into the absorptivity profile of a waveguide to optimally match the thermal profile of the waveguide based thermal energy extraction apparatus during exposure to a heat source, such that the absorption strength and the frequency of the absorption band is commensurate with the temperature across the one or more dimensions of the extraction apparatus. The extracted thermal energy in the form of electromagnetic radiation may then be converted into other forms, based on need, such as electrical energy through photovoltaics. Alternatively, the electromagnetic energy can be converted to mechanical, thermal, or a modified form (wavelength, intensity, etc.) of electromagnetic energy. The electromagnetic energy could also be passed to a sink of that energy such as by launching into the far field or to a large area optical absorber sufficiently far from the source of the heat or the housing of the source of the heat to perform the function of cooling.

Thermal emission enhancement and thermal spectra tailoring have been observed in a variety of materials some of which are micro/nanostructured, heavily doped semiconductors, rare earth doped, quantum dots embedded, and in tandem with nano-gaps to extract the extraordinary near-field thermal emissions. These techniques can greatly improve on the overall thermal emission and address desired aspects such as spectral specificity using up-conversion, down-conversion photonic bandgaps and isolated decay channels for application such as in Thermophotovoltaic (TPV) systems. The thermal emission of a material can be significantly altered by changes in the chemical composition of the environment containing the thermal energy extraction waveguide. (U.S. patent application Ser. No. 15/160,389, herein incorporated by reference in its entirety). In one exemplary embodiment it is observed that when a film of titanium dioxide is implemented with an optical fiber waveguide; a 60% increase in the collected optical power is attained when the environment was changed from air to one containing hydrogen, when placed in a furnace heated to 800 C. In another exemplary embodiment, when a film of niobium doped titanium dioxide is integrated with an optical fiber waveguide and placed inside a furnace heated to 800 C, the extracted optical power was increased by 123% when the composition of the environment was changed from air to one containing hydrogen. It is further contemplated that Thermophotovoltaic and Thermoelectric systems could benefit from exchanging some or part of their internal environment to one having a beneficial improvement in the extracted energy, whereby the exchanged environment beneficially alters the system's chemical, physical, or electrical property, as contemplated here.

There is an existing and emerging need for passive cooling approaches composed of electrically insulating constituents for high power devices in which the generated power density is thermal management limited. Optical waveguide based thermal energy extraction can also be used for passive cooling in electrical and electronic devices (e.g. power converters, transformers, etc.) wherein the waveguide based thermal extraction apparatus is one having compositional constituents that do not pose significant electromagnetic interference hazards. The challenge is to extract heat from high power density devices while avoiding undesired interactions through electromagnetic coupling which can lead to reduced device performance and even device failure. Optical waveguide based thermal extraction approaches offer the potential for extracting the generated heat without the need for electrical wires, electrical contacts, and actively powered approaches which are parasitic for the overall performances of high power devices. In such applications, planar waveguide based thermal energy harvesting devices may be particularly suitable. As just one example, large area thin glass substrates of less than ~1 mm in thickness (as thin as 100 micron, 50 micron, or even less in some cases) can act as the waveguide medium when integrated with a thermally emissive material. The device and the integrated thermally emitting material may be patterned through lithographic or other techniques in order to maximize energy transfer, As another example, thin films of appropriate refractive index deposited on glass or other substrates can act as waveguides. Herein, a waveguide can be defined as one material sandwiched between one or more media possessing a refractive index which allow the trapping of electromagnetic radiation in whole or in part for removing said electromagnetic radiation from a heat source generating said electromagnetic radiation to a location removed from the heat source.

BRIEF SUMMARY OF THE DISCLOSURE

In an exemplary embodiment, using a thermal energy extraction apparatus comprising an optical waveguide, a thermally emissive material comprising an emissive material which emits electromagnetic radiation upon absorption of thermal energy, and a receiver adapted to receive the electromagnetic radiation.

The thermally emissive material can be utilized with optical fiber type waveguides, planar waveguides, or waveguides of other geometries. The optical fiber waveguide based thermal energy extraction can include an optical fiber coupled to a receiver, wherein the emissive material is one of or combination of deposited on a core, on the end-face, on the cladding, coated on the optical fiber, and integrated with the optical fiber to facilitate the conversion and capture of thermal energy in the form of electromagnetic radiation into the optical fiber for extraction to a location removed from the heat source. The optical fiber thermal energy harvesting device can include an optical fiber coupled to a receiver, wherein the emissive material is integrated with one of a core, a cladding, or a combination of the core and the cladding of the optical fiber to optimize the electromagnetic radiation energy density carried away by the optical fiber from the heat source. A receiver is such a device adapted to receive the electromagnetic radiation extracted by the waveguide. Necessarily, the receiver must be in electromagnetic communication with the waveguide. Exemplary receivers are photovoltaic cell arrays and environments capable of acting as an energy sinks, In some embodiments, the receiver can include two receivers each at opposite ends of an optical fiber thermal energy extraction apparatus, Further, the receiver may function to convert the extracted energy into other forms of energy such as electricity or to perform work. The optical fiber thermal energy extraction apparatus can include a bundled fiber with a plurality of optical fibers therein with the emissive material to extract electromagnetic energy from a heat source to a receiver for conversion into other forms of energy. The optical fiber can also include modifications constituting an "in-fiber" device, such as fiber Bragg gratings, notches, holes, and various other modifications. It is contemplated that these modifications can alter the emissive properties of the fiber and can be used in conjunction with other emissive coatings, In some embodiments, the optical waveguide is a planar type waveguide. It is further contemplated that the modifications described above for the optical fiber waveguide are transferable to waveguides of different geometry, such as planar waveguide for the purpose of extracting thermal energy in the form of electromagnetic radiation, In the case of planar waveguide based structures, one could the structure to optimize the thermal extraction through integrated waveguide approaches. Waveguide manufacturing is a mature field of study and, as such, patterning approaches are well-known in the field and can be accomplished through selective ion-exchange of glasses to modify local refractive indices, laser based processing, nanofabrication lithography, reactive ion etching, ion implantation, doping, etc.

An emissive material may interact with environmental chemistry to provide an altered emissivity, providing an enhancement in some property beneficial to the extraction of electromagnetic energy, for example by altering the electromagnetic energy density and spectra to improve upon another parameter of interest, such as conversion efficiency. When a thermally emissive material is integrated with the optical fiber platform in an evanescent configuration (e.g. deposited within the evanescent penetration depth of the waveguide), the thermal emission of the material can be extracted through tunneling to the optical fiber by overlapping the emissive material near-field and optical fiber evanescent regions. It is contemplated that the same would also hold true for waveguides having planar or other forms of geometry. In some cases, the optical fiber or planar waveguide can be patterned or featured such as through a surface relief to enhance the coupling of thermal radiation into the waveguide.

The emissive material can include, without limitation, one of $TiO_2$, Nb doped $TiO_2$, porous $TiO_2$, metal-nanoparticle incorporated $TiO_2$, $CaMnNbO_3$, and a combination thereof. Material properties beneficial to the extraction of thermal radiation include without limitation ones with properties of electronic conductivity, ionic conductivity, hydrogen absorptivity, surface plasmon resonance, surface phonon resonance, adsorbate vibration, and localized surface plasmon resonance (LSPR). In some embodiments some or all portions portion of the environment may be exchanged with a desired composition beneficial the performance of the apparatus. The emissive material can include a perovskite oxide. The emissive material can include strontium titanate ($SrTiO_3$), and doped $SrTiO_3$. The emissive material can include one of the thermally emissive materials directly deposited on a material, the thermally emissive materials on an underlayer, the thermally emissive materials embedded in a matrix phase, a monolithic film with the thermally emissive materials, and the thermally emissive materials embedded in a multi-layer stack and/or overcoated by another film layer. The thermally emissive material may be deposited in the vicinity of the optical waveguide as to facilitate the tunneling of excited optical states to the waveguide. The emissive material can also include modifications to an optical fiber waveguide core and/or cladding material composition (e.g. doping, rare earth doping, transition metal doping, metallic nanoparticle doping) or associated defect structure through processing (e.g. thermal treatments in reactive gas compositions, engineered laser treatments, thermal treatments in a mechanical strain).

In one embodiment, a method for thermal energy harvesting using waveguides in optical communication with thermally emissive materials comprises emitting radiation by the thermally emissive materials responsive to thermal energy, collecting the electromagnetic radiation by the waveguide, and receiving the electromagnetic radiation with a receiver.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 1A-1F are diagrams of various thermally emissive layers including particulate thermal emitters on a support (FIG. 1A), particulate thermal emitters on an underlayer (FIG. 1B), particular thermal emitters embedded in a matrix phase (FIG. 1C), a monolithic film of a thermally emissive material on a support (FIG. 1D), incorporated in a multilayer stack (FIG. 1E), and under an overlayer (FIG. 1F). It is envisioned that some or all parts of FIGS. 1A-1F may be integrated with electromagnetic waveguides, which may he in the form of optical fiber, planar waveguides, etc.

FIG. 2A is an exemplary diagram that illustrates one of the general operating principles of extracting thermal energy with materials integrated with optical fiber, which is the extraction of thermal energy through tunneling into the optical fiber waveguide, wherein the diagram of FIG. 2A shows a through configuration for which the modification to extract the electromagnetic energy from heat is positioned between the two ends of the optical fiber waveguide. Another embodiment is an end coating configuration which may provide a beneficial change in the extracted electromagnetic energy from a heat source (FIG. 2B).

FIG. 3 contains a diagram and a graph providing additional details on the waveguide based thermal energy extraction apparatus depicting coatings positioned at different locations. The intent of the drawing is to convey that the emissive material may be varied in one or more dimensions of the waveguide as to alter properties of the material beneficial to the overall function of the apparatus. It is contemplated that thermal gradients may develop through the waveguide wherein each section may be optimized for operation at the temperature and chemical composition acting upon the, respective section. Although, the thermal emissive based material elements are illustrated as films on the waveguide, in some embodiments the thermally emissive elements can be comprised within the waveguide, the cladding of the waveguide, etc. Where the absorptivity of the emissive material can be tuned as appropriate along one or more dimensions of the apparatus in order to improve upon an overall property such as the extracted electromagnetic energy, for example. The graph illustrates absorptivity peaks at different wavelength locations realized by quantum dots. It is contemplated that one method to induce variations without limitations would be to use such materials.

FIGS. 6A-6B are graphs that illustrate the total electromagnetic powers and power densities extracted as a function of various gaseous and temperature environmental conditions for a variety of thermally emitting sensing materials and configurations. FIG. 6A list the measured electromagnetic power with different thermally emissive materials. An end cut unmodified FG105LCA optical fiber placed against an emissive aluminum oxide block (Bare-Fiber-End) in the geometry of FIG. 2B, and a FG105LCA optical fiber fed through the entire tube furnace (Bare-Fiber-Through) for which one end of the fiber was used to measure the extracted optical power, in a geometry illustrated by FIG. 2A, is provided for reference. Except for the end cut measurement listed, the other test were performed with the fiber fed through the entirety of the tube furnace. FIG. 6B list the detailed measurement obtained by varying the temperature of the furnace in which the fiber was placed, with various environments. The optical power was measured using only one end of the optical fiber, while it was confirmed that both ends of the optical fiber had optical power of similar values. Furthermore, in FIG. 6B the powers would be measured at higher temperatures are listed as projected values, with associated power densities. The power density is calculated by dividing the measured optical power with the cross sectional area of the optical fiber.

DETAILED DESCRIPTION OF THE DISCLOSURE

Figure 2A:
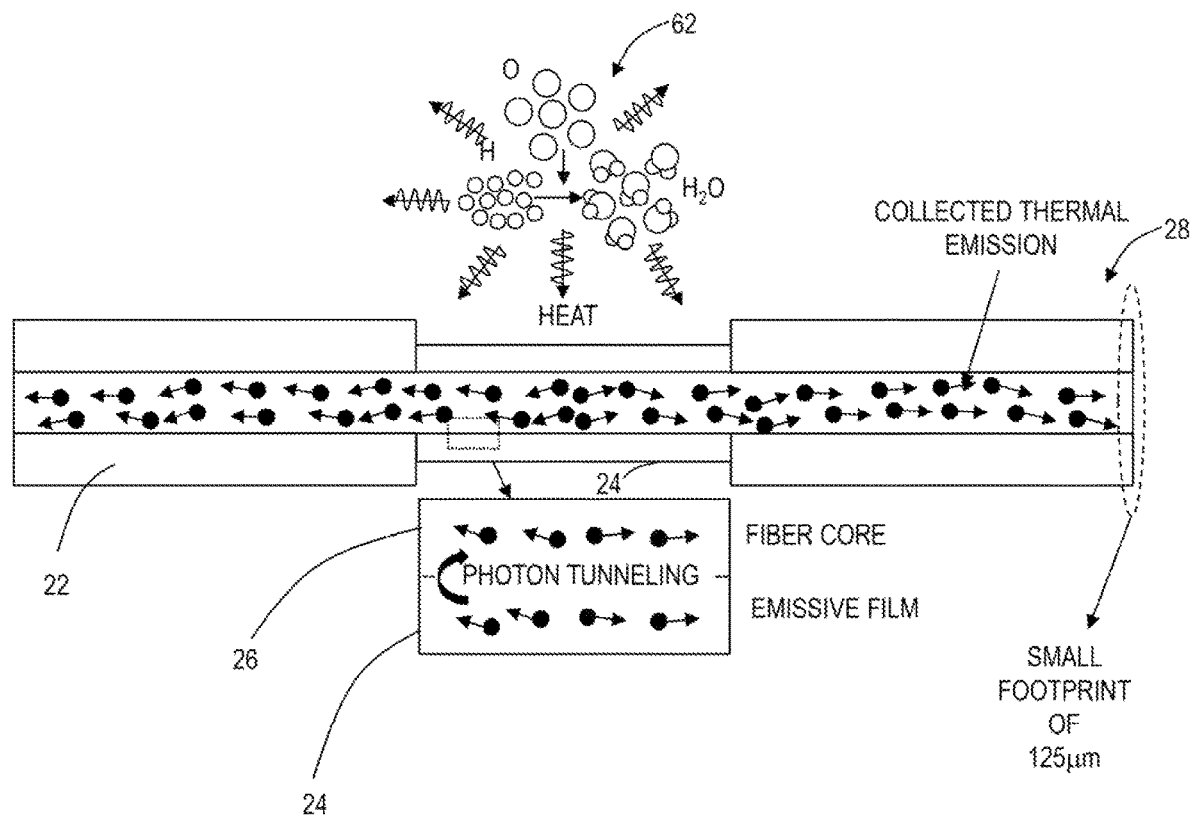
FIGS. 2A-2B are exemplary diagrams of an optical fiber thermal energy harvesting device employing light absorbing and/or scattering emissive materials as compared to one exemplary optical fiber sensor exploiting the thermally emissive sensing materials of FIGS. 1A-1F.

In various exemplary embodiments, the present disclosure relates to an apparatus for the extraction of electromagnetic radiation from a heat source through the use of thermally emissive materials integrated with an optical waveguide for waste heat recovery, power generation, as well as in other applications such as for cooling. It is contemplated that the apparatus will perform the function of removing heat from a heat source in the form of electromagnetic radiation. The thermally emissive materials exploit the thermal energy mediated light emission of materials and the dependence of the thermal emissivity of the materials on effective optical constants which may be linked with environmental parameters of interest including chemistry.

The effective optical constants are constituted by, without limitation, the electronic conductivity of the material, the density of the material, the chemical identity of the material, and a volumetric expansion of the material. It is contemplated that a thermally emissive material may be integrated with the optical fiber waveguide in an end-coating, a side-coating configuration, be a composing part of the optical fiber waveguide, or any combination thereof in order to extracted electromagnetic energy from a heat source.

In a circumstance that heat flow is present, the described waveguide based thermal energy extraction apparatus attempts to increase the flow of energy from the heat source in the form of electromagnetic radiation inside said waveguide. Herein, the heat source may be one of, without limitation, combusting fossil fuels, solar energy, nuclear energy, radioisotope energy, and geothermal energy. It is further contemplated that combustion releases heat whose form is electromagnetic radiation, in the majority in an environment which does not possess good thermal conductivity, and in which the convective fluid flow is not substantial. The same would also be true for nuclear based energy such as decay, fission, and fusion where a substantial part of the released energy is in the form of electromagnetic radiation which, without a medium possessing strong convection and thermal conduction, will stay in that form and can be extracted as such. Methods described herein place waveguides in the vicinity of heat sources to providing a direct method of thermal energy extraction in the form of electromagnetic radiation. Herein, thermal energy is defined as the heat generated by a source which can be in the form of electromagnetic radiation/photon gas, atomic/molecular vibrations/phonon gas, kinetic energy of electrons and electron vibrations, and can be communicated by conduction, convection, electromagnetic radiation, and the tunneling of photons and electrons.

A waveguide being modified by one of the methods depicted in FIG. 1A-1F, without limitation, which describe the integration of emissive materials, can have an increased performance in extracting the electromagnetic radiation from a heat source. The emissive material may have wavelength conversion capability such to redistribute the thermal energy in a more preferred wavelength band. The emissive material may have a property allowing it to provide a strong near-field thermal radiation, such as would be obtained by surface charge density waves present in plasmonic materials. It is also known that heat will be accompanied by a characteristic electromagnetic radiation as defined by Wien's law. The thermally emissive materials can be incorporated into an engineered film, potentially through nanostructuring, with directivity such that it emits light in the direction needed and also potentially with a desired spectral profile. Transformation optics and conformal mapping techniques could be utilized to design the electromagnetic properties of the emissive materials in order to also influence the absorptivity, directivity, spectral profile, and angular compression properties. Where, angular compression properties is defined as a material possessing electromagnetic properties allowing it to collect electromagnetic radiation from a broad angular span and emit electromagnetic radiation in a reduced angular span, which could have the benefit of coupling more light into electromagnetic waveguides. It may also perform the angular compression directly without needing to absorb electromagnetic radiation. It is currently believed that in places where the far-field emissivity of metals is exceptionally low, it is due to the fact that surface excitations are dominant in this wavelength regime, and these have non propagating wave vectors, thereby only observable by disturbing the near-field with optical channels that can extract electromagnetic radiation into the far-field. Henceforth, films of these metals and materials may be beneficial for waveguide based thermal energy extraction given that waveguides can disturb the near-field by providing optical channels through which thermally excited surfaces waves can propagate to the far-field. As long as the temperature of the heat source is such that there is sufficient energy in the emitted wavelength range to excite the resonance of the material.

For waveguide based thermal energy harvesting, the exploitation of directionally emissive materials such as aligned carbon nanotubes or patterned structures, gratings for example, can provide enhancement in the emitted light by the material and can potentially he further enhanced by the modification of some electrical, physical, and or chemical parameter of the emissive materials through chemical changes in the environment. In addition, backfilled and or infiltrated directionally emissive materials such as aligned and/or patterned structures may also be used to enhance the overall collected optical power. In some cases, such aligned, patterned, and/or spatially varying emissive material structures may be introduced within the cladding or core of an optical fiber or within the wave guiding layer or an adjacent layer of a planar optical waveguide. It is contemplated that directionally emissive material include materials exhibiting strong near-field thermal radiation. It is further contemplated that the extraction of near-field thermal radiation requires bringing optical channels near the surface of the material. Such as an optical waveguide near the surface of a plasmonic material in a heated environment containing enough thermal energy sufficient to excite the plamonic resonance. The optical waveguide, having allowed propagating modes within, provides optical channels to which the near-field excited optical states can couple to for extraction into the far-field.

Thermal Emissivity

Referring to FIGS. 1A-1F, in various exemplary embodiments, diagrams illustrate thermally emissive materials 10 including particulate thermal emitters 12 on a support 14 (FIG. 1A), particulate thermal emitters 12 on an underlayer 16 (FIG. 1B), particular thermal emitters 12 embedded in a matrix phase 18 (FIG. 1C), a monolithic film 20 of a thermally emissive material on a substrate 14 (FIG. 1D), the various embodiments incorporated in a multilayer stack (FIG. 1E), and under an overlayer (FIG. 1F). Those of ordinary skill in the art will recognize the various exemplary embodiments presented in FIGS. 1A-1F are for illustration purposes. Various other embodiments are also contemplated, including various combinations of the exemplary embodiments of FIGS. 1A-1F. FIG. 1E can have monolithic layers and particulate layers, in various combinations. There can also be different thickness layers, etc. as desired. The coating may be a structured material. such as by having a porosity. Or by structuring and making use of certain near-field thermal emissions to provide an angular dependence to the emissivity, encompassing structuring in 1D, 2D, and 3D geometries. The particulate thermal emitters 12 could be plasmonic nanoparticles, quantum dots, quantum wells, rare-Earth containing nanoparticles and materials, trapped atoms or molecules inside a matrix to constitute a clathrate, rare earth element or transition metal dopants within a matrix, or local defects within a structure, etc. The particular thermal emitters 12 are included in a matrix or material to act as emitters or emissivity modifiers. The monolithic film can be materials possessing a free electron concentration, a material with the property of ionic conductivity, polar materials, materials with surface phonon polaritons, materials with surface plasmon polaritons, and materials containing molecular vibrations and surface adsorbates, amongst others. The particulate thermal emitters 12 are included in another material to act as an emitter, although a relationship between particulate thermal emitters and host may exist that enhances the thermal emissivity which could be further enhanced by environment chemistry. It contemplated that FIGS. 1A-1F may compose or be some part of an electromagnetic waveguide. It is further contemplated that FIGS. 1A-1F may be some modifications performed to an electromagnetic waveguide, or some portion of the waveguide as to enhance the collected electromagnetic energy.

The thermally emissive materials 10 generates, facilitates, or does both to enhance the coupling of electromagnetic radiation into a waveguide for extraction from a location from which there is a flow of thermal energy. It is also contemplated that some of the thermal radiation from the heat source can directly couple to the optical fiber by end-face capture, by scattering, or by evanescent coupling. Similarly, some of the heat source can directly couple to a planar waveguide through the same methods. Any temperature difference in a system gives rise to the flow of heat, and the premise stated here attempts to take advantage of the heat flow by optimizing the portion that is converted to electromagnetic radiation and coupled into the optical fiber waveguide as to be guide away from the heat source. The process of converting thermal energy to propagating electromagnetic radiation is accomplished by vibrations and/or oscillations taking place inside said emissive materials. The flow of heat can be accommodated in a variety of forms from conduction, phonon transport, convection, etc. For waveguide based energy harvesting, it is preferred to maximize the optical transport of heat. Where, in the case of evanescent thermal radiation it is envisioned that through the use of methods such as, but not limited to, tunneling, scattering, and the inclusion of vacuum gaps and other materials, will have the effect of generating propagating light inside the waveguide. It is contemplated that the near field light may not be propagating until some mechanism is employed to facilitate propagation, such as tunneling, scattering, and leaky mode interactions. The source of the vibrations can be surface plasmon polaritons, surface phonon polaritons, localized surface plasmon resonance, molecular vibrations such as OH resonances from rotation and stretching etc., lattice vibrations, other various movements of charged particles, inter-band resonances, quantum confinement, quantum wells, quantum dots, rare-Earth transitions, clathrate compounds in which atoms or molecules exist in cage-like structures and have vibrational degree of freedom, and materials such as Heusler and Half-Heusler alloys, proton conductors, ion conductors, sorbents, zeolites, materials useful for thermoelectric conversion, etc. Herein, thermoelectric materials are defined to be good electrical conductors and poor thermal conductor at the same time, allowing an increase in the temperature differential across the material which, in turn, increases the potential for energy extraction. In addition, structuring thermally emissive materials can have an influence on the direction of the thermal emission and the spectral profile. Structuring may be accomplished in 0D, 1D, 2D, and 3D geometry, such as dots, multilayer stacks, surface corrugations, nanorods, photonic/photonic crystals, porous materials, gratings, etc. In addition, the inclusion of spacers made of vacuum or other materials which prevent or reduce the conduction of heat could be used to enhance the conversion of the thermal energy to electromagnetic radiation. Furthermore, it is envisioned that various combinations of the said methodologies and materials can be combined together to form one which improves the desired properties. It is also envisioned that material property changes along the length of waveguide could be designed to optimize the coupled optical power, due to temperature gradients that can take place. Where it is contemplated that the absorptivity and the energy of the absorptivity would need to be adjusted in a material to enhance the electromagnetic extraction potential at the respective temperature the materials is exposed to. Associated chemical changes in the environment interfere with the process of thermal-electromagnetic radiation including changes to the process or to the extent of the process, i.e., strength, frequency, direction, etc. This interference can be used to an advantage by the use of materials and systems that fully utilize this property. In the case of thermal energy harvesting, such as in thermophotovoltaics and thermoelectrics, this change can enhance the output thermal radiation or electric current, thereby enhancing the conversion efficiency of the system.

A relationship exists between the emissivity of a material and the absorptivity. This relationship is a measure of the radiative thermal emission of a real material as compared to a blackbody for which the maximum amount of radiative thermal emission can be generated at a given temperature at equilibrium. Absorptivity is well known to be dictated by the optical and physical constants of a given material system. For example, Au incorporated oxide materials have demonstrated a shift in a characteristic absorption peak associated with Au nanoparticles upon exposure to reducing or oxidizing conditions under elevated temperature conditions. The origin of this shift can be a modification to the refractive index of the oxide material and/or an effective charge transfer to and from Au nanoparticles.

Example embodiments of the emissive materials falling within the scope of the method and apparatus are illustrated in FIGS. 1A-1F. In some embodiments, the thermally emitting material may be utilized in particulate or nanoparticulate form as illustrated in FIGS. 1A-1C. The particulate thermal emitters 12 could be deposited directly on substrates 14 as shown in FIG. 1A, deposited on the underlayer 16 as shown in FIG. 1B, and embedded in a matrix material or phase 18 as shown in FIG. 1C. The exploitation of the underlayers 16 or matrix phase 18 can help to improve adhesion, increase high-temperature stability, and/or modify the effective optical/physical/electrical/thermal properties of the thermally emissive materials 10. Over-layers can also be placed on the materials and/or the layers can be integrated into a multilayered stack for the purpose of optimizing the effective properties for compatibility with a particular optical platform/waveguide. Thermally emissive layers can also be utilized in the form of a monolithic or a porous film 20 deposited on a support/waveguide 14 as shown in FIG. 1D, FIG. 1E illustrates the particulate thermal emitters 12 incorporated in a multilayer stack, and FIG. 1F illustrates the particulate thermal emitters 12 under an overlayer. Once again, underlayers and overlayers as well as integration into multilayered stacks may be utilized to optimize the effective power collection. In addition, the thermally emissive materials 10 and the particulate thermal emitters 12 may be embedded within multilayer thin film stacks to optimize their optical performance and/or high temperature and harsh environment stability. The thermally emissive material may be placed inside an optical cavity, which could be manufactured in a variety of ways such as through gratings, mirrors, notches, and etc. The cavity could alter the spectral profile of the emitted light and increase the magnitude of the light leaving the system in a preferred wavelength range, and when the system is well engineered a thermally driven laser could also be fabricated where some of the properties of the laser would be derived from changes in the emissive material which may be due to environment chemistry. It is known in the art that the photovoltaic conversion of light into electricity is most efficient in a narrow wavelength band, in which the quantum efficiencies can be as high as 90%. Therefore, by ensuring that only in-band light exits to the receiving apparatus, these high efficiencies may be taken advantage of. As is known in the art, there are numerous methods to limit the wavelength band of light in efficient manners, with the preferred method of photon recycling where out of band-light is sent back to the hot-zone for thermal conversion through various methods. Photon recycling can be accomplished through approaches such as reflective filtering, optical cavities, etc. The optical waveguide geometry can perform certain filtering functions, itself.

Thermal Energy Extraction with Optical Fiber Waveguides

Figure 2B:
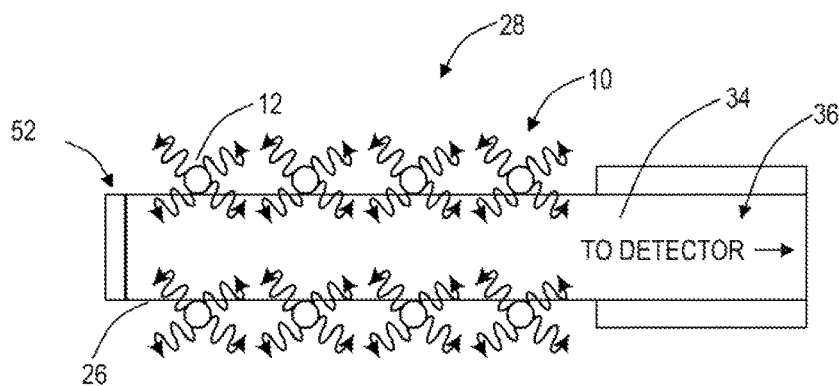

Referring to FIG. 2A, in an exemplary embodiment, the diagram illustrates one operating principles of the thermally emissive materials 10 in the optical fiber waveguide structure 28. This diagram depicts an optical fiber waveguide which is modified in the central portion by removing the cladding material and replacing it with a preferred emissive material. In this exemplary diagram, photon tunneling is depicted as the coupling mechanism of thermally emitted light into the core 34 of the optical fiber. It is further contemplated that the shown exemplary material may possess a thermally excitable surface charge density wave which, when excited by thermal energy, generates electromagnetic radiation inside the waveguide through tunneling. In addition to tunneling, other mechanisms such as, but not limited to, direct emission into the core and scattering may be utilized. Here, the optical fiber waveguide 28 includes an emissive film 24 deposited on the optical fiber 34 core, wherein the emissive film can replace the cladding 22 partly or wholly, The emissive film 24 can include one of the thermally emissive materials 10, such as in FIGS. 1A-1F. The placement of the emissive film 24 on the optical fiber 34 increases the light extraction efficiency. In non-structured materials ("structured materials" referring to surface relief gratings, photonic/phononic crystals, carbon nanotubes, fiber Bragg gratings, etc.) generally there is not a preferred direction to thermal emission, unless utilizing the thermal near-field emission of certain materials. When coated on the optical fiber 34, light within the acceptance cone of the optical fiber 34 is collected across the thermally emissive coating length of the emissive film 24. The emissive film 24 can be a thin film coating on the order of ~50 nm (or larger, including up to 20 times the size, such as several micrometers, or smaller such as a <50 nm), where the thickness of the film facilitates the coupling, of the emitted thermal radiation into the many electromagnetic (EM) modes inside the optical fiber 34 core, potentially through tunneling, scattering and leaky mode interactions. By this type of a configuration, thermal radiation can be directly coupled into guided modes inside the optical fiber 34 core and allows the optical fiber waveguide 34 to extract the thermal radiation of the emissive film 24. It is also envisioned that a configuration in which the described emissive materials can also be placed on an end face of an optical fiber (FIG. 2B), in which case the light emitted by the coating will be captured by the optical fiber by direct coupling, where again careful engineering and materials selection could be performed to enhance the overall collected optical power. It is further envisioned that in some cases the modifications depicted in FIG. 2A and FIG. 2B could be combined. Although the above description was based upon the optical fiber based waveguide structure, other waveguide structures can also be used with similar coupling mechanisms for thermal emission such as planar waveguide based structures.

The optical fiber-based implementation may in part, which may be substantial, relies on near-field thermal radiation of the emissivity material coupled to the far-field by coupling to allowed electromagnetic modes inside a waveguide in an evanescent configuration (FIG. 2A) due to k-vector matching that inherently exists to support such a coupling mechanism, especially in a heavily multimode fiber having thousands of modes. This evanescent based coupling approach is in contrast to measuring the near-field thermal emission by placing a scattering source in the near-field such as a tungsten tip, nanoparticles or by other techniques such as scanning near-field optical microscopy (SNOM) in analyzing the local electromagnetic density of states. Similar evanescent based coupling could also be accomplished through a planar waveguide based structure, with enhancements in k-vector matching and hence coupling efficiency of thermal emission to guided modes in the waveguide through surface relief gratings, leaky mode interaction, scattering, and others.

Figure 8:
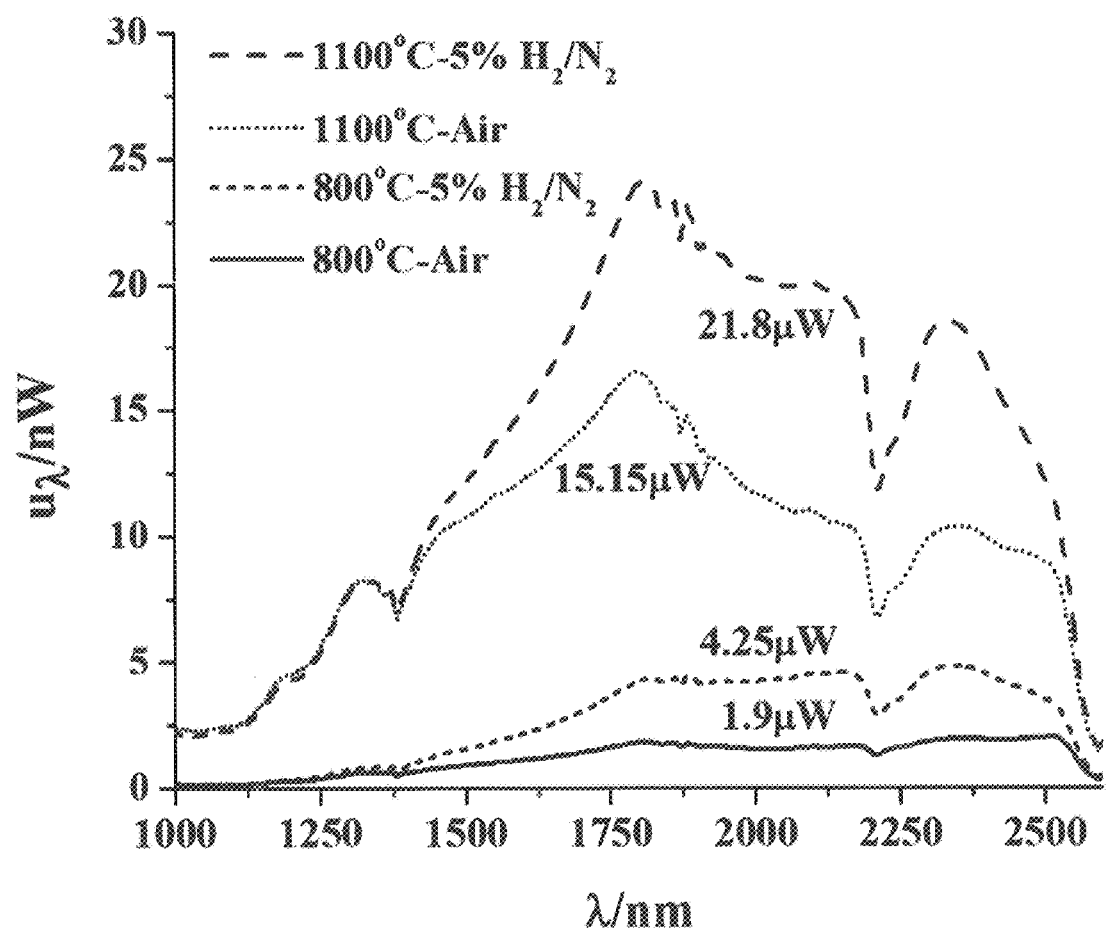
FIG. 8 is a graph that illustrates the spectrum of the extracted electromagnetic energy measured with an optical spectrum analyzer, along with power measurements listed by the respective graphs for 5 at % niobium doped $TiO_2$ under various gaseous and temperature environmental conditions. It is observed that the extracted electromagnetic radiation is significantly enhanced by changing the environment from air to one that contains hydrogen.

Furthermore, significant changes can be induced in the extracted electromagnetic power obtained with thermally emissive materials. In one exemplary embodiment with a 5 at % niobium doped $TiO_2$ emissive film 24 integrated with the optical fiber 34 in the evanescent configuration is shown to exhibit significant enhancements in the extracted optical power upon the exchange of the chemical composition of the environment (FIG. 8). In one instance at a furnace temperature of 800 C, the measures optical power increased from 1.9 µW to 4.25 µW, when the environment was changed from air to one containing 5% hydrogen in nitrogen. In another instance at a furnace temperature of 1100 C, an increase in the measured optical power was observed which increased from 15.15 µW to 21.8 µW upon exchanging air with 5% hydrogen in nitrogen. Modifications to the electrical, physical, and chemical properties of the emissive materials, associated with interactions between chemical species and the material, are believed to be responsible for the observed changes in the spectral profile and/or the magnitude of the emissivity. To this end, the method and apparatus include an exemplary embodiment exposed to hydrogen to exemplify the observed increase in the collected optical power. The presented results show clear evidence of chemical composition based increase in the optical power by exposure to hydrogen compositions at temperatures of 800° C. and 1100° C. The presented configuration, in which the emissive film 24 is integrated with the optical fiber 34, provides an interesting opportunity for thermal energy harvesting with great potential to take advantage of the generally much stronger thermally generated near-field electromagnetic energy. The presented paradigm should provide a new route for thermal energy harvesting with a wide Impact in energy generation systems, chemical plants, and other high-temperature processes where there is a significant amount of waste heat, or in systems where it could be deployed to directly harness the thermal energy generated and replace current methods.

Figure 4:
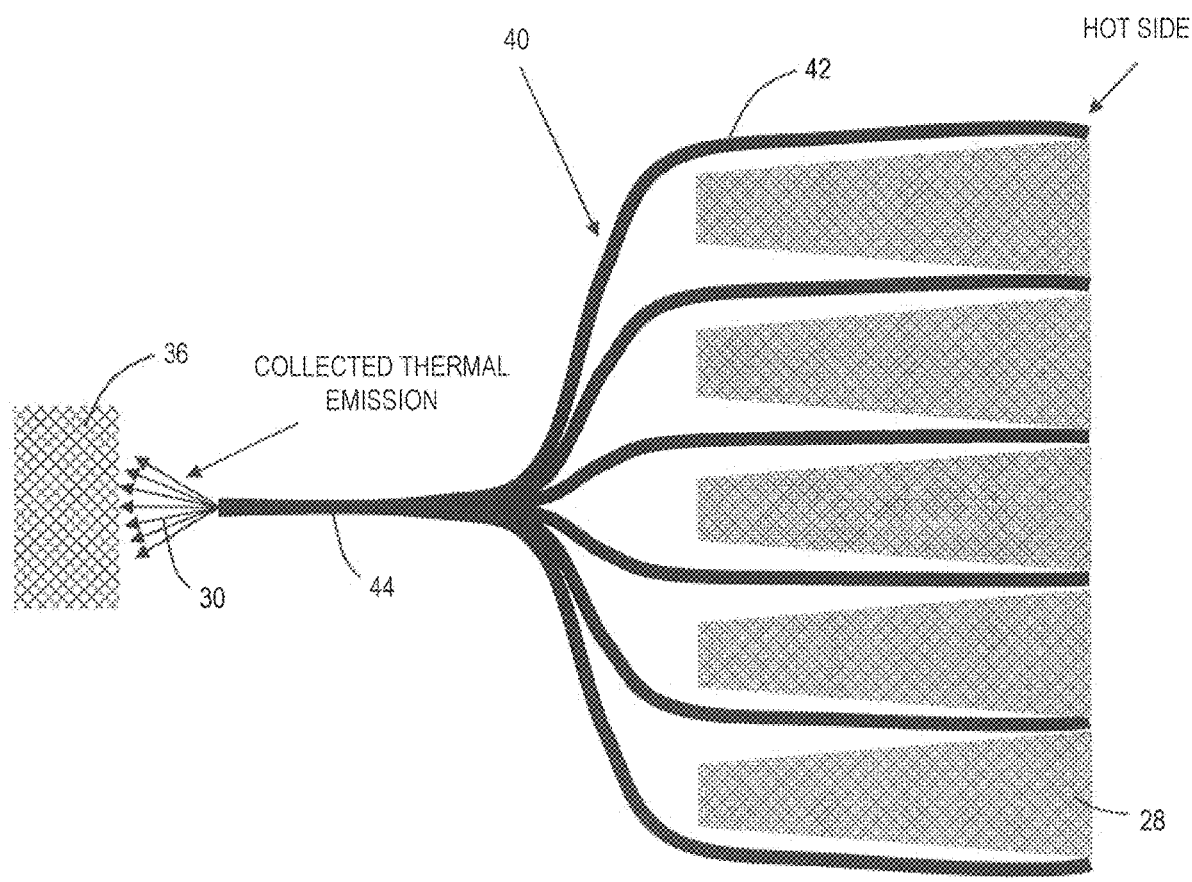
FIG. 4 is an exemplary diagram of a planar waveguide thermal energy extraction apparatus comprising an array of waveguides, a thermal energy source, and a receiver. The waveguide array 40 comprising a plurality of waveguides 42 can be modified by emissive materials, as in one exemplary embodiment emissive, materials 28 are placed in communication range of the waveguides 42 in order to couple electromagnetic radiation into the waveguides for extraction to a receiver 36 removed from the source of the thermal energy. In this exemplary embodiment the waveguides comprising the waveguide array are merged together in to a bundle 44 to reduce the cross sectional area with the benefit of having a reduced area for the receiver. In this exemplary embodiment the emissive materials arc tapered to exemplify one method of controlling the electromagnetic loss introduced to the waveguides in order to address the need of matching electromagnetic loss profiles with developed thermal gradient profiles.

Referring to FIG. 4, exemplary embodiment, a diagram depicting a planar waveguide array integrated with an emissive material to extract electromagnetic radiation from thermal energy to a location removed from the thermal energy source, to a receiver adapted to receive the thermal energy. As depicted but without limitation, the waveguide array can be composed of many waveguides that come together to form one waveguide. In one embodiment the thermally emissive material can be placed in electromagnetic communication range of the waveguide to couple radiation to the electromagnetic channels provided by the waveguide. As depicted, the emissive material may be tapered in order to improve upon a beneficial parameter, such as the extracted power density, by engineering the electromagnetic loss and the frequency band of the loss to be commensurate with the thermal gradient across the waveguide array. The extracted radiation, extracted to a location removed from the heat source, is then sent to a receiver. A receiver can optionally utilize the extracted electromagnetic energy by conversion into other forms of energy, such as electric energy, or can simply disperse the radiation to perform a cooling function.

It is further contemplated that by waveguide based thermal energy extraction, a receiver can be placed at an arbitrary distance from the heat source, allowing the receiver components to be composed of lower cost materials that would be otherwise unstable at higher temperatures.

Figure 5:
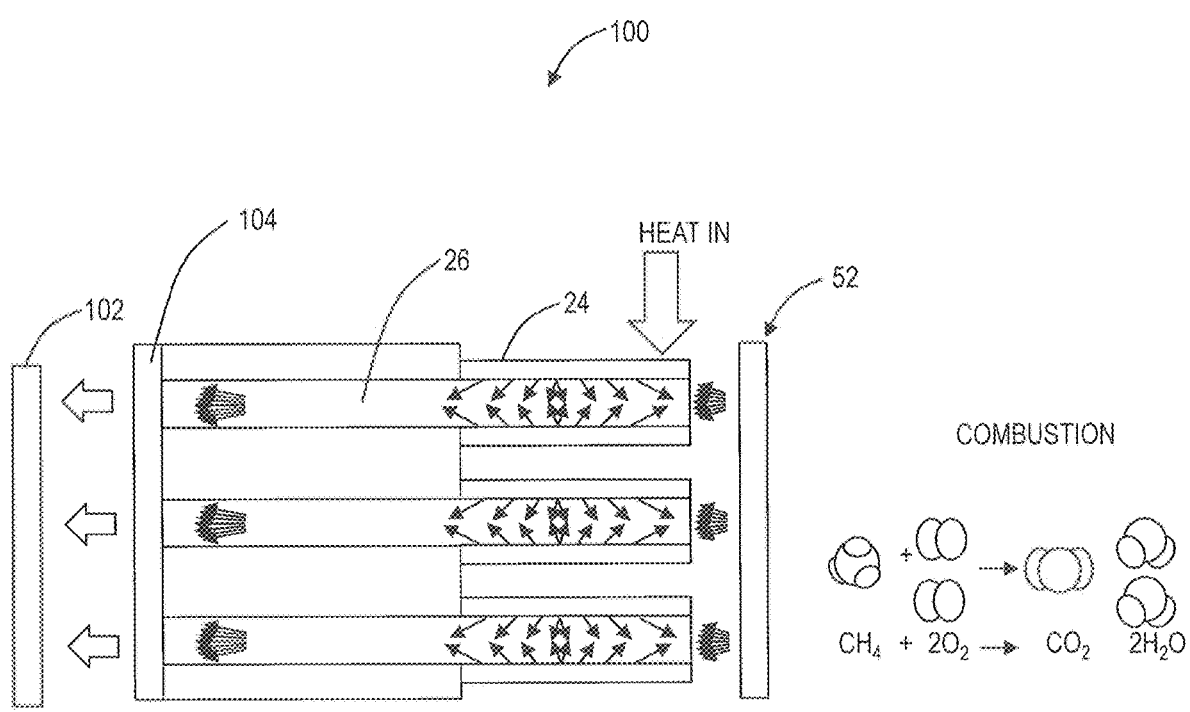
FIGS. 5 is a schematic diagram that illustrates an optical fiber waveguide based thermal energy extraction system including an optical fiber stack engineered to improve upon the thermal light extraction from wheat source such as combustion, nuclear fission, geothermal, for example. The optical fiber waveguide, itself, has filtering properties for electromagnetic radiation and, by further coupling with additional filtering, which may be implemented on the cooler side of the apparatus, can be used to eliminate wavelengths detrimental to a reception apparatus, such as a photovoltaic cells. The filtering may be one that is reflective based, to return the less optimal electromagnetic energy outside of the preferred wavelength band back to the heat source for recycling.

Referring to FIG. 5, in an exemplary embodiment, a schematic diagram illustrates an optical fiber based thermal energy harvesting system 100. The thermally emissive sensing materials 10 can be used to convert and facilitate the extraction of thermal energy such that it is inside an optical waveguide, which can be converted to other forms of energy such as electrical energy when placed in tandem with a photovoltaic cell 102 or another type of photon to electrical energy conversion device, at an arbitrary distance away from the heat source. The individual fiber waveguides may then be combine to form bundles (a waveguide integrated into an optical array or network of waveguides) to, again, be extracted away from the heat source and sent an arbitrary distance away at which point it may be converted into other useful energy, such as electricity using photovoltaic cells potentially coupled with filters. If present, the filters 104 can act to restrict non-optimal light wavelengths from interacting with the photovoltaic cell, where the non-preferred wavelengths can be returned to and be recycled by the hot-zone. In other cases, the thermal energy may simply be carried away rather than be converted to another form of useful energy in order to assist in overall thermal management of a component. The thermal to optical conversion and transport of heat is particularly advantageous for electrical and electrified components where standard heat sinks such as electrical conductors are highly undesirable. Environmentally/chemically induced emissivity variations can also help to improve upon the conversion of thermal energy into light, or thermal energy into an increase in free electron density/mobility etc., simply electrical properties, which could be extracted or can further be converted into light. For example, changing the chemical composition of the environment to one containing an optimal composition of hydrogen with other gases can act to increase the thermally emitted light, which may be useful in thermophotovoltaics, in conjunction with sensing and spectroscopy. Given that the environment induced changes alter the materials chemical, physical, or electrical properties, thermoelectric systems could also see an efficiency enhancement by changing the environment for some or all portion of the system. The thermally emissive material could be in the presence of chemical reactions or could facilitate chemical reactions whose product can be that which enhances the thermally emitted light, or the free electron density/mobility, which may be heat, charge transference, radical formation, chemical identity change, a variety of surface interaction, and etc. When fiber is used, the carried away heat in the fiber in the form of electromagnetic radiation does not need to be converted and may also serve the function of heat transfer or heat conduction away from a place desired to be cooled or a place desired to be heated remotely from the heat source. However, converting the light in the fiber to electricity would provide the added benefit of energy recovery in application where it makes sense. In some cases, the carried away energy in the form of guided electromagnetic radiation in the waveguide may be converted instead to an alternative form of energy such as mechanical or thermal energy or even optical energy with a different characteristic wavelength and/or intensity.

A variety of configurations could be explored with the goal of optimizing the conversion/collection of thermal energy by the optical fiber 34. In one realization the ends of the optical fiber 34 could be modified by replacing the cladding material with one that improves upon thermal emission near-field thermal coupling to guided modes inside the fiber core along with maximizing the collected light by the end-face of the fiber (FIG. 2B), which may also involve some of the described methodologies, to obtain a combined thermal energy to collected light conversion and extraction maximum. Then, individual fibers could be stacked to form a bundle (FIG. 5), block, or brick with or without other optimizing material constituents. In a further modification the property of the incorporated material with the optical waveguide could be altered such to take advantage of possible temperature gradients that may exist (FIG. 3). The hot side of the fiber would collect/convert thermal energy into light. The colder side of the fiber/fiber-stack could be combined with a filter, which could easily be fabricated through standard techniques such as sputtering, sol-gel deposition, spray coating, etc., only to allow photovoltaic (PV)-cell preferred light to pass through, returning other wavelengths back to the thermal source for recycling. Where, the filter component is deemed as an optimizing component in some cases, not a necessary one for thermal energy extraction. A PV cell could also be directly integrated into the fiber in the end-coating configuration or as a side coating which would interact either through evanescence, through leaky modes, or through scattering, etc. An optical fiber waveguide optimized for collecting/converting thermal energy into light in the desired wavelength range could find uses in other areas, as well. For example, one could seek to apply the concept for enhanced thermal conduction without the presence of corresponding electrical conduction through light extraction and transport. In contrast, more conventional thermal conductors such as an equivalent dimension of copper wire will typically also display a large electronic conductivity that can be disadvantageous in the case of electrified systems and would leak heat throughout, whereas guided heat in the form of electromagnetic radiation can be engineered to have very little leaky losses. This type of geometry can also potentially be optimized to extract near-field thermal radiation which has been recently shown to be larger than predictions of far-field blackbody thermal radiation by orders of magnitude. In one embodiment, the specialty nanomaterial coating would harvest nearby thermal energy and convert it to guided light in the fiber by coupling the strong near-field radiation into guided modes, in addition to or in conjunction with scattering and leaky mode interactions. The hot end face of the fiber could be placed at an optimal distance from a thermal emitter to harvest thermal energy. Then, individual fibers could be combined into a block or a brick and combined with filtering and photovoltaic cells.

Although the methodologies described in the immediately preceding section focused on the application of the optical fiber waveguide platform, similar strategies and advantages can also be derived for alternative waveguide platforms such as planar waveguide based structures. In some applications, planar waveguide based embodiments may be particularly advantageous. For example, in the case of power electronics or power conversion devices, a planar waveguide would allow for a large area heat sink without an undesired high level of electrical conductivity. The maximum rate of heat transfer away from a component or surface may also be maximized in some cases through the application of patterning of a planar waveguide to avoid or minimize the re-absorption of thermal emission coupled into the waveguide structure by the thermally emitting material.

Example Embodiments: Metal Oxide Based Thermal Energy Harvesting

A number of metal oxide based materials were explored for the emissive film 60 to examine their benefit to enhance the extraction of thermal energy when integrated with the optical fiber waveguide. Standard silica based (125 µm) multimode optical fiber 34 with fluorine doped cladding and a core size of ~105 µm was modified by removing the 20 µm cladding material for a 3 cm approximate length of fiber using buffered hydrofluoric acid (Hf) etching. The emissive films 24 were coated on the optical fiber 34 by generating a droplet of the prepared coating solution using a micropipette and dragging it across the modified length of optical fiber 34, Several coatings may be applied successively to increase the desired film thickness. The typically coated film thicknesses are on the order of ~100 nm. The as prepared optical fibers 34 were then annealed in a high-temperature furnace in an air atmosphere at temperatures from 800° to 950° C. The emissivity of the thin-film-coated fibers were measured in the same furnace by adjusting the temperature and by replacing the air atmosphere with controlled amounts of nitrogen, hydrogen, and oxygen.

Exemplary results show the variations in the measured extracted thermal energy in the form of electromagnetic power as a function of the material coating. Additional developments are possible by incorporating the many detailed techniques for thermal radiation tailoring from free carrier doping, doping by rare earth atoms, the inclusion of quantum dots, including polar interfaces to enhance the EM density of states, by interrupting thermal conduction at the film-fiber interface to preferentially enhance thermal radiation, employing ionic/proton conductors to selectively interact with chemical species, and so on. The present disclosure provides a new paradigm for thermal energy harvesting with wide impact in a variety of energy generation and other high-temperature processes, where either the direct extraction is feasible with this method or it may also be used to attempt to recover waste heat in the systems. The device may also be used to extract and guide away parasitic heat present in a number of devices or processes. Optical fiber has the benefit of having small form and it is quite flexible. It could be looped around electronics that generate a lot of heat to extract said heat in the form of light and be guided away. In essence, optical waveguide based thermal extraction provides an energy flow channel which can be more efficient than without. In addition, the lack of electronic conductivity exhibits significant advantages in eases where electrical contacts, wires, or signals are not desired for the component. In some cases, alternative waveguide based structures such as planar waveguides may be advantageous embodiments. For example a large-area planar waveguide based thermal emission heat extraction system could be applied on the surface of components or electrical and electronic systems.

Example Embodiments: Binary Metal Oxide and Metal Nanoparticle Incorporated Oxide Emissive Layers Rytov's theory of fluctuational electrodynamics brought new insights to thermal physics as it predicted the thermal near-field, with evanescent emissions orders of magnitude greater than that predicted by Planck's far-field theory. Thermal fluctuations in the motions of charged particles are present in all matter, producing currents that can excite optical decay channels, such as surface phonon/plasmon polaritons with strong evanescent thermal emissions. Silica and silicon carbide are explored materials owing to their polar structure, supporting surface phonon polaritons. In heavily doped silicon nanoscale evanescent exchange coupling is predicted to yield an astonishing five orders of magnitude increase in the radiative flux, relative to Planck's far-field prediction, due to the large EM density of surface states. In addition, in thin films with thicknesses comparable to the optical penetration depth, the entire volume can contribute by increasing the photon lifetime and through other mechanisms such as delocalized surface waves.

In conventional experimentation, measurement of the evanescent thermal near field is achieved by scattering into the far-field for observation. In contrast, optical fibers 34 and other optical waveguide structures can provide rich tunneling possibilities for surface and in volume thermal excitations due to high guided EM mode densities and can extract the collected electromagnetic power to removed locations where receivers composed of cheaper components can be used to process the extracted power. This is as opposed to some thermophotovoltaic system for which photovoltaic cells need to withstand higher temperatures and thus place a higher demand on design and material constituents, thereby increasing cost.

To demonstrate embodiments of the invention disclosed, experiments were conducted for binary metal oxide films as described in more detail below. Referring to FIGS. 6A-6B, in an exemplary embodiment, charts illustrate the various measured optical powers using an optical power meter. In FIG. 6A the measured optical power for films composed of various materials is provided at temperature of 800 C and 1100 C. At 800 C measurements performed in an environment containing oxygen and one containing hydrogen is provided. It is observed that hydrogen provided a substantial enhancement in the measured optical powers for the system examined. An etched but not coated fiber was also measured for reference (Bare-Fiber-Through). In addition, an end cut fiber that was not etched and was placed against an aluminum oxide block is provided for a second reference (Bare-Fiber-End), which demonstrated the capture of optical fiber by an end face alone. In all cases fibers that were coated with an emissive material provided an increase in the measured optical power. The most optical power was extracted from the 5 at % Nb doped $TiO_2$ system, which is believed to function on the principle of frustrated plamonic activity. In this system the Nb dopant provides a substantial increase in the free carrier concentration which can be thermally excited to generate tunneling evanescent waves. However, doping also introduces scattering centers which compete with the development of a sustained surface plasmons wave, and hence decay more readily. This is supported by the lack of observing the footprint of a plasmonic type resonance in the measured spectrum. Titanium dioxide can also exhibit a very high electrical conductivity upon reduction with hydrogen at high temperatures, but also at the cost of the introduction of scattering centers. Therefore, Nb doped $TiO_2$ and hydrogen doped $TiO_2$ are two preferred exemplary materials system tested to date, and they are both believed to provide the high measured optical powers due to an increase in their free carrier densities and associated changes in the carrier mobilities. FIG. 6B list the measured optical powers for a film of mesoporous $TiO_2$ from temperatures of 800 C to 1100 C. incrementally. Furthermore, based on the measured trends a projection was made to illustrate the optical power extraction possibilities near the temperatures at which hydrogen and methane combusts. At 2000 C the projection estimates that a power density of 2381 $mW/cm^{-2}$ may he achieved, which is substantial and compares well with current energy generation methods. Although, the material constituents of the optical fiber would have to be exchanged with ones capable of operating at very high temperatures, such as sapphire for example. It is also important to note that the current optical fiber modification method is not optimized, henceforth it is reasonable to assume that more substantial measured powers could be achieved after further developments, after carefully engineering the many working constituents of the apparatus.

Figures 7A, 7B:
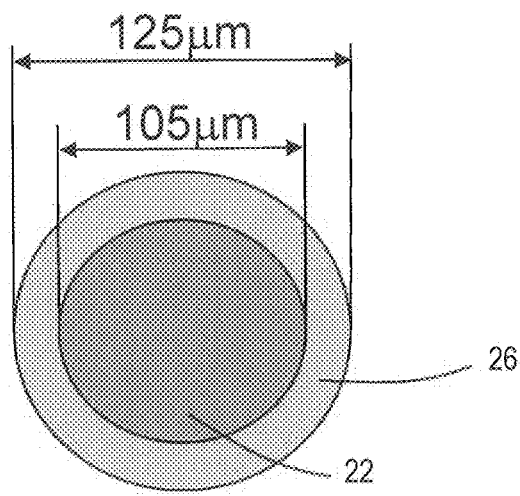
FIGS. 7A-7B exemplify the cross sectional geometry of the FG105LCA optical fiber used for the exemplary measurements along with, measured power densities for a variety of material films integrated with the optical fiber waveguide. The power densities were obtained by dividing the measured optical powers with the cross sectional area of the optical fiber waveguide.

Referring to FIG. 7A to 7B, in an exemplary embodiment, 6A illustrates the cross sectional geometry of the silica optical fiber, with a fluorine doped cladding. FIG. 6B shows a chart of the calculated power densities for the various materials and conditions examined at 1100 C in 5% hydrogen in nitrogen, obtained by dividing, the measured optical power with the cross sectional area of the optical fiber waveguide. The integration of an Nb doped $TiO_2$ film with the optical fiber waveguide provides a power density of 50 $mW/cm^{-2}$ at 1100 C, which is substantial. By projecting up the measured trend, at 2000 C the estimated optical power density would be predicted at 2381 $mW/cm^{-2}$. As outlined in this work, there are numerous way to improve upon the current implementation. One such optimization is to engineer loss directly into the optical fiber in a way to minimize the modal mismatch at interfaces, Another is to optimize the properties of the emissive material such as conductivity, porosity, thickness, etc. It is envisioned that thin films of material could be engineered directly into the core of the optical fiber for which the surface excited waves can directly couple into propagating modes. In contrast, a cladding modification would rely on tunneling based coupling.

Referring to FIG. 8, in an exemplary embodiment, illustrates the spectrum of the extracted electromagnetic energy when a 5 at % Nb doped $TiO_2$ film is coated on a 6 cm etched portion of an optical fiber wave aide and placed inside a tube furnace such that the modified portion of the fiber was at the center of the heated zone and the two fiber ends came outside of the heated zone and were extracting optical power. The spectra were measured at 800 C and 1100 C in air and 5% hydrogen in nitrogen. Furthermore, the optical powers were measured with a power meter and provided next to the respective graphs. A substantial increase in the extracted optical power was observed when the environment was changed from air to that containing hydrogen, Under these conditions the free carrier concentration in the emissive material should undergo a substantial increase followed by modification in the carrier mobility, as well.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A thermal energy extraction apparatus comprising:
    an electromagnetic waveguide;
    a thermally emissive material comprising high refractory oxides, wherein the thermally emissive material is one of deposited on a core, the end-face of the waveguide, coated on the waveguide, and integrated with the waveguide to extract thermal energy, wherein the thermally emissive material comprises emissive materials which emit electromagnetic radiation, wherein electromagnetic radiation is emitted upon absorption of thermal energy; and
    two receivers, one receiver at each of opposing ends of the electromagnetic waveguide and adapted to receive the electromagnetic radiation.

2. The thermal energy extraction apparatus of claim 1, wherein the electromagnetic waveguide is an optical fiber.

3. A thermal energy extraction apparatus comprising:
an electromagnetic waveguide;
a thermally emissive material, wherein the thermally emissive material is one of deposited on a core or the end-face of the waveguide, coated on the waveguide, and integrated with the waveguide to extract thermal energy, further wherein the thermally emissive material comprises at least one of $Nb-TiO_2$, $TiO_2$, porous $TiO_2$, metal nanoparticle incorporated $TiO_2$, strontium titanate ($SrTiO_3$), doped $SrTiO_3$, and $CaMnNbO_{3-x}$ nanocomposites and materials, where the emissive material further comprises emissive materials which emit electromagnetic radiation, wherein electromagnetic radiation is emitted upon absorption of thermal energy; and
a receiver adapted to receive the electromagnetic radiation, wherein the receiver comprises two receivers each at opposing ends of the optical fiber.

4. The thermal energy extraction apparatus of claim 3, wherein the thermally emissive material comprises one or more thermally emissive materials directly disposed to a material, the thermally emissive materials on an underlayer, the thermally emissive materials embedded in a matrix phase, a monolithic film with the thermally emissive materials, the thermally emissive materials embedded in a multi-layer stack, the thermally emissive materials overcoated by another thin film layer, and the thermally emissive materials coated atop a thin film layer.

5. The thermal energy extraction apparatus of claim 3, wherein the electromagnetic waveguide is an optical fiber.

6. A thermal energy extraction apparatus comprising:
an electromagnetic waveguide;
a thermally emissive material, wherein the thermally emissive material is one of deposited on a core or the end-face of the waveguide, coated on the waveguide, and integrated with the waveguide to extract thermal energy, further wherein the thermally emissive material comprises at least one of $Nb-TiO_2$, $TiO_2$, porous $TiO_2$, metal nanoparticle incorporated $TiO_2$, strontium titanate ($SrTiO_3$), doped $SrTiO_3$, and $CaMnNbO_{3-x}$ nanocomposites and materials, where the emissive material further comprises emissive materials which emit electromagnetic radiation, wherein electromagnetic radiation is emitted upon absorption of thermal energy, wherein the thermally emissive material interacts with the waveguide by overlapping the emissive material near field and waveguide evanescent regions; and a receiver adapted to receive the electromagnetic radiation.

7. The thermal energy extraction apparatus of claim 6, wherein the electromagnetic waveguide is an optical fiber.

8. The thermal energy extraction apparatus of claim 7, wherein the receiver comprises two receivers each at opposing ends of the optical fiber.

9. The thermal energy extraction apparatus of claim 6, wherein the thermally emissive material comprises one or more thermally emissive materials directly disposed to a material, the thermally emissive materials on an underlayer, the thermally emissive materials embedded in a matrix phase, a monolithic film with the thermally emissive materials, the thermally emissive materials embedded in a multi-layer stack, the thermally emissive materials overcoated by another thin film layer, and the thermally emissive materials coated atop a thin film layer.

* * * * *